United States Patent Office 2,712,553
Patented July 5, 1955

2,712,553
SYNTHESIS OF METHIONINE

Joseph Feltzin, Brooklyn, N. Y.

No Drawing. Application March 25, 1954,
Serial No. 418,750

8 Claims. (Cl. 260—534)

This invention is for an improved process for the synthesis of dl-methionine. By starting with and utilizing the relatively inexpensive pyruvic acid, dl-methionine may be obtained inexpensively and in good yield.

The present application is a continuation in part of my co-pending application Serial #230,257, filed June 6, 1951, and now abandoned, for "Synthesis of Methionine."

In this synthesis pyruvic acid is condensed with formaldehyde under proper conditions to form alpha-keto gamma hydroxy butyric acid. The reaction may be represented as follows:

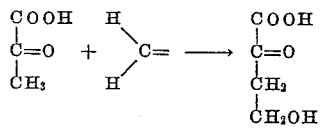

It is seen from the equation that the condensation involved is of the aldol type. The nature of the reacting substances allows a rather good reaction. The reaction may be described in terms of ionic and electronic interpretation of the mechanism of organic reactions. The carbonyl oxygen of pyruvic acid is an electronegative group and draws electrons toward itself. This leaves the carbonyl carbon atom relatively electron deficient. This deficiency is furthered by the electronic distribution in the carboxyl group, which because of its makeup is also electron attracting. The overall effect is to produce a deficiency of electrons around the carbonyl carbon atoms. The methyl group attached to it is relatively rich in electrons and the carbonyl carbon, in an attempt to rectify the imbalance draws electrons toward itself thus weakening the bond between the methyl carbon atom and an attached hydrogen. The hydrogen therefore becomes somewhat labile. This effect can be enhanced by the presence of a basic catalyst such as the hydroxide or carbonate ion. Aldol condensations are base catalyzed. These electronic exchanges can be represented as follows:

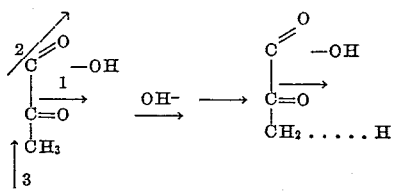

Such an exchange predicts the condensation of pyruvic acid with itself and this is prevented by using the sodium salt and carrying out the reaction at a temperature between 0 and 5° C. In fact if the reaction is not carried out at this low temperature the pyruvic acid does condense to give a plastic, gummy product. This results from pyruvic acid in the presence of a basic catalyst at a temperature of 0–5° C. producing a relatively labile hydrogen. The formaldehyde has an electronic structure which accommodates the exchange. The oxygen being electronegative exerts an electron inductive effect towards itself thereby making itself electronegative and methylene (carbon) electropositive. This may be represented as follows:

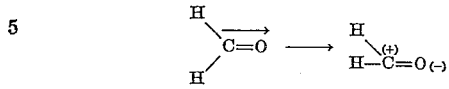

The labile hydrogen from the pyruvic acid then easily associates with this electronegative oxygen and the rest of the molecule attaches itself to the positive methylene group. The whole reaction is therefore representd as follows:

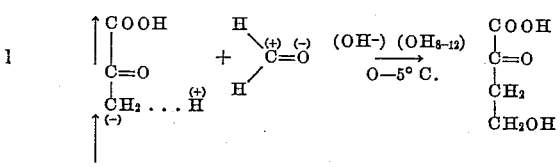

alpha-keto-gamma hydroxy butyric acid is unstable and immediately becomes converted to its lactone as follows:

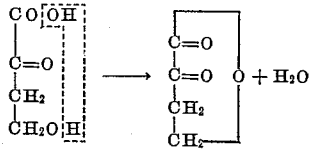

The lactone is then treated with a hydrazine such as phenylhydrazine to produce the corresponding hydrazone or with ammonia to form the corresponding imine.

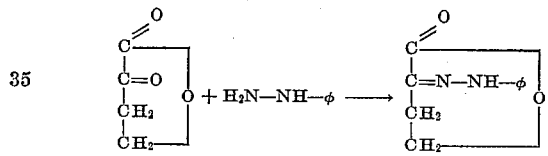

The hydrazone precipitates out of the aqueous solution and is brown in color. It is then filtered out and treated with gaseous hydrogen halide such as gaseous hydrogen chloride in a suitable solvent. This effects the breakage of the lactone five-membered ring with the production of the chloro derivative:

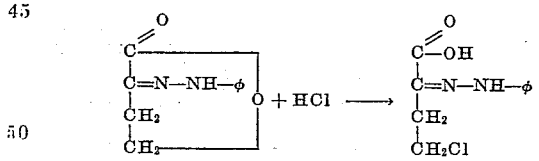

The halo derivative is then treated with the alkali metal salt of mercaptan such as sodium methyl mercapatan and this metathetic reaction introduces the thiomethyl group into the molecule.

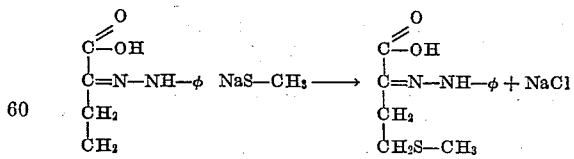

This derivative is then reduced by means of hydrogen gas in the presence of a catalyst such as finely divided palladium or nickel to produce methionine (racemic d-l):

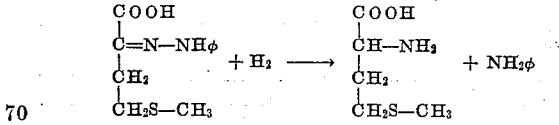

The following example illustrates the method for carrying out this invention. It is to be understood however that this example is merely given as a means of illustration of the synthesis and it not a limitation thereon.

Eleven grams of pyruvic acid are placed in an Erlenmeyer flask containing 10 cc. of water and 10 grams of ice. The mixture is stirred and sodium carbonate is added in small portions with stirring until a pH of 9–12 is obtained. Nine to eleven grams of the carbonate will be required. When foaming has ceased and all of the carbonate has dissolved 10.8 cc. of 37% solution formaldehyde are added with stirring. The temperature at all times must be kept between 0 and 5° C. When all of these reactants have been added the mixture is stirred completely and allowed to stand for at least two days in the icebox. After this time a saturated solution of phenyl hydrazine in hydrochloric acid is added. This solution should contain 10 grams of phenylhydrazine. The mixture is allowed to stand for several hours in the cold. When precipitation of the brownish phenyl hydrazone derivative of alpha-keto-gamma-hydroxy-butyric acid is complete it is filtered out of the mixture and recrystallized from absolute alcohol. The hydrazone is then dissolved in an inert solvent such as ether or benzene and treated with gaseous hydrogen chloride in the cold (10–20° C.). The solvent is then allowed to evaporate the chloro derivative weighed and treated with a stoichiometric quantity of sodium methyl mercaptan in a solvent such as benzene. The mixture may have to be refluxed for reaction to take place. The benzene is evaporated and the mixture is washed with water to dissolve the sodium chloride. The thio methyl hydrazone is then dissolved in an inert solvent such as alcohol, benzene or ether and treated under pressure with hydrogen gas in the presence of a catalyst. The methionine is recrystallized from warm 65% alcohol.

I claim:

1. A process of synthesizing dl-methionine, comprising the steps of reacting an alkali metal salt of pyruvic acid at a temperature of 0–5° C. with formaldehyde so as to form alpha keto gamma hydroxybutyric acid which converts to alpha keto gamma butyrolactone; treating the thus formed alpha keto gamma butyrolactone with a substance selected from the group consisting of hydrazines and ammonia so as to form the corresponding derivative of said alpha keto gamma butyrolactone and said substance selected from the group consisting of hydrazines and ammonia; dissolving the thus formed derivative in a solvent therefor so as to form a solution of the same; treating said solution of said derivative with a hydrogen halide so as to form the corresponding halo derivative thereof; and treating the thus formed halo derivative with an alkali metal methylmercaptan and reducing the resulting product with hydrogen, thereby forming dl-methionine.

2. A process of synthesizing dl-methionine, comprising the steps of reacting an alkali metal salt of pyruvic acid at a temperature of 0–5° C. with formaldehyde so as to form alpha keto gamma hydroxybutyric acid which converts to alpha keto gamma butyrolactone; treating the thus formed alpha keto gamma butyrolactone with a substance selected from the group consisting of hydrazines and ammonia so as to form the corresponding derivative of said alpha keto gamma butyrolactone and said substance selected from the group consisting of hydrazines and ammonia; dissolving the thus formed derivative in a solvent therefor so as to form a solution of the same; treating said solution of said derivative with hydrogen chloride so as to form the corresponding chloro derivative thereof; and treating the thus formed chloro derivative with an alkali metal methylmercaptan and reducing the resulting product with hydrogen, thereby forming dl-methionine.

3. A process of synthesizing dl-methionine, comprising the steps of reacting an alkali metal salt of pyruvic acid at a temperature of 0–5° C. with formaldehyde in substantially equimolecular quantities so as to form alpha keto gamma hydroxybutyric acid which converts to alpha keto gamma butyrolactone; treating the thus formed alpha keto gamma butyrolactone with a substance selected from the group consisting of hydrazines and ammonia so as to form the corresponding derivative of said alpha keto gamma butyrolactone and said substance selected from the group consisting of hydrazines and ammonia; dissolving the thus formed derivative in a solvent therefor so as to form a solution of the same; treating said solution of said derivative with a hydrogen halide so as to form the corresponding halo derivative thereof; and treating the thus formed halo derivative with an alkali metal methylmercaptan and reducing the resulting product with hydrogen, thereby forming dl-methionine.

4. A process of synthesizing dl-methionine, comprising the steps of reacting an alkali metal salt of pyruvic acid at a temperature of 0–5° C. with formaldehyde so as to form alpha keto gamma hydroxybutyric acid which converts to alpha keto gamma butyrolactone; treating the thus formed alpha keto gamma butyrolactone with a hydrazine so as to form the corresponding hydrazine derivative of said alpha keto gamma butyrolactone; dissolving the thus formed derivative in a solvent therefor so as to form a solution of the same; treating said solution of said derivative with a hydrogen halide so as to form the corresponding halo derivative thereof; and treating the thus formed halo derivative with an alkali metal methylmercaptan and reducing the resulting product with hydrogen, thereby forming dl-methionine.

5. A process of synthesizing dl-methionine, comprising the steps of reacting an alkali metal salt of pyruvic acid at a temperature of 0–5° C. with formaldehyde so as to form alpha keto gamma hydroxybutyric acid which converts to alpha keto gamma butyrolactone; treating the thus formed alpha keto gamma butyrolactone with ammonia so as to form the corresponding imine derivative; dissolving the thus formed derivative in a solvent therefor so as to form a solution of the same; treating said solution of said derivative with a hydrogen halide so as to form the corresponding halo derivative thereof; and treating the thus formed halo derivative with an alkali metal methylmercaptan and reducing the resulting product with hydrogen, thereby forming dl-methionine.

6. A process of synthesizing dl-methionine, comprising the steps of reacting an alkali metal salt of pyruvic acid at a temperature of between 0 and 5° C. with formaldehyde in substantially equimolar quantities so as to form alpha keto butylactone; treating the thus formed alpha keto gamma butyrolactone with a hydrazine so as to form the corresponding hydrazine derivative of said alpha keto gamma butyrolactone; dissolving the thus formed derivative in a solvent therefor so as to form a solution of the same; treating said solution of said derivative with a hydrogen halide so as to form the corresponding halo derivative thereof; and treating the thus formed halo derivative with an alkali metal methylmercaptan and reducing the resulting product with hydrogen, thereby forming dl-methionine.

7. A process of synthesizing dl-methionine, comprising the steps of reacting an alkali metal salt of pyruvic acid at a temperature of between 0 and 5° C. with formaldehyde so as to form alpha keto gamma hydroxybutyric acid which converts to alpha keto gamma butyrolactone; treating the thus formed alpha keto gamma butyrolactone with ammonia so as to form the corresponding imine derivative; dissolving the thus formed derivative in a solvent therefor so as to form a solution of the same; treating said solution of said derivative with a hydrogen halide so as to form the corresponding halo derivative thereof; and treating the thus formed halo derivative with an alkali metal methylmercaptan and reducing the resulting product with hydrogen, thereby forming dl-methionine.

8. A process of synthesizing dl-methionine, comprising the steps of reacting an alkali metal salt of pyruvic acid at a temperature of 0–5° C. with formaldehyde so as to form alpha keto gamma hydroxybutyric acid which converts to alpha keto gamma butyrolactone; treating the thus formed alpha keto gamma butyrolactone with phenyl hydrazine so as to form the corresponding hydrazine derivative; dissolving the thus formed derivative in a solvent therefor so as to form a solution of the same; treating said solution of said derivative with hydrogen chloride so as to form the corresponding chloro derivative thereof; and treating the thus formed chloro derivative with an alkali metal methylmercaptan and reducing the resulting product with hydrogen, thereby forming dl-methionine.

No references cited.